(12) United States Patent
Mans et al.

(10) Patent No.: US 9,534,099 B2
(45) Date of Patent: Jan. 3, 2017

(54) SPONGE CLOTH WITH NET

(75) Inventors: Leo Mans, Mainz (DE); Norbert Tueschen, Wiesbaden (DE)

(73) Assignee: Kalle GmbH, Wiesbaden (DE)

( * ) Notice: Subject to any disclaimer, the term of this patent is extended or adjusted under 35 U.S.C. 154(b) by 1487 days.

(21) Appl. No.: 13/053,409

(22) Filed: Mar. 22, 2011

(65) Prior Publication Data

US 2011/0232018 A1    Sep. 29, 2011

(30) Foreign Application Priority Data

Mar. 26, 2010 (DE) .................. 10 2010 012 878

(51) Int. Cl.
| | | |
|---|---|---|
| *D21H 13/02* | (2006.01) | |
| *C08J 9/00* | (2006.01) | |
| *A47L 13/16* | (2006.01) | |
| *B32B 23/10* | (2006.01) | |

(52) U.S. Cl.
CPC .............. *C08J 9/0085* (2013.01); *A47L 13/16* (2013.01); *B32B 23/10* (2013.01); *C08J 2201/0444* (2013.01); *C08J 2301/02* (2013.01)

(58) Field of Classification Search
CPC ... A47L 13/16; B32B 23/10; C08J 2201/0444; C08J 2301/02; C08J 9/0085
USPC ....... 156/62.2; 15/209.1; 424/404, 405, 409, 424/410, 413, 443, 457, 411
See application file for complete search history.

(56) References Cited

U.S. PATENT DOCUMENTS

| | | |
|---|---|---|
| 3,709,764 A | 1/1973 | Thomas |
| 6,235,302 B1 * | 5/2001 | Mans et al. ................... 424/411 |
| 2003/0135181 A1 | 7/2003 | Chen et al. |
| 2005/0136238 A1 | 6/2005 | Lindsay et al. |

FOREIGN PATENT DOCUMENTS

| | | |
|---|---|---|
| DE | 1 193 237 B | 5/1965 |
| DE | 27 07 308 A1 | 2/1977 |
| DE | 26 56 698 A1 | 6/1978 |
| DE | 197 53 546 A1 | 6/1999 |
| EP | 1 314 390 A1 | 5/2003 |
| EP | 1 600 096 A2 | 11/2005 |
| EP | 1 693 407 A2 | 8/2006 |
| NL | 7 802 847 | 9/1978 |
| WO | WO 97/42259 A1 | 11/1997 |
| WO | WO 2004/021855 A1 | 3/2004 |
| WO | WO 2005/034711 A1 | 4/2005 |
| WO | WO 2008/119990 A2 | 10/2008 |

* cited by examiner

*Primary Examiner* — Arti Singh-Pandey
(74) *Attorney, Agent, or Firm* — ProPat, L.L.C.

(57) ABSTRACT

A cellulose sponge cloth containing a net or grid as internal reinforcement is provided, with the sponge cloth further including a uniform distribution of fibers and/or durably softening polymers that are not water-leachable. The sponge cloth is produced by the viscose process by mixing with the fibers and/or the softening polymers and the pore former with cellulose xanthate and forming the resulting sponge cloth raw material into a thin layer. The grid or net is placed onto this layer, followed by a further layer of the sponge cloth raw material. Coagulation and regeneration baths and optional wash baths are used to dissolve the pore former out of the sponge cloth and regenerate the cellulose. The sponge cloth is bend-resistant, it does not break in the dry state. The sponge cloth is envisioned for cleaning and decontamination.

19 Claims, No Drawings

SPONGE CLOTH WITH NET

CROSS-REFERENCE TO RELATED APPLICATIONS

This application claims priority to German Patent Application 10 2010 012 878.3 filed Mar. 26, 2010, which is hereby incorporated herein by reference in its entirety.

FIELD OF THE INVENTION

The present invention relates to a cellulose-based sponge cloth incorporating a net/grid embedded therein as a mechanical reinforcement. The sponge cloth is useful for cleaning and decontaminating duties in industry and the home.

BACKGROUND OF THE INVENTION

Sponge cloth production by the viscose process is well known (see for example DE C 1 193 237, whose United States equivalent is U.S. Pat. No. 3,068,545; DE A 26 56 968, whose United States equivalent is U.S. Pat. No. 4,232, 128; and DE-A 27 07 308 whose United States equivalent is U.S. Pat. No. 4,198,968). First pulp, more particularly wood pulp, is converted with sodium hydroxide and carbon disulfide into an alkaline cellulose xanthate solution known as viscose. Glauber's salt (sodium sulfate decahydrate) is then added and uniformly mixed with the viscose. This sponge cloth raw material is then applied to an endless belt in the form of a layer to whichever height (thickness) is desired.

Cellulose regeneration takes place in a heated, alkaline coagulation bath. It can also be carried out in an acidic medium, for example dilute sulfuric acid.

Fiber-reinforced sponge cloth is generally produced by cotton noils being degreased with dilute NaOH and mercerized. Viscose, Glauber's salt and cotton fibers are then mixed together, generally by means of a kneader, to form a homogeneous mass. The fibers generally have an average length in the range from 0.5 to 4.5 cm. The sponge cloth material is then spread out and regenerated as described. After cellulose regeneration, the fibers have become bonded into the sponge cloth body. It is of particular importance that the distribution of the fibers is homogeneous and three-dimensional. To achieve this, the cotton noils have to be fully opened and wetted, or the fibers tend to curl and knot. Uniform internal reinforcement is then no longer ensured.

Glauber's salt has a very low melting point (about 32 to 33° C.). It therefore melts in the coagulation bath and is dissolved out. The disappearing salt crystals leave pores and voids behind. Finally, the sponge cloth is washed off to rid it of salt residues and adhering reaction products. After drying, it is cut into narrow lengths, which in turn are rolled up. The roll material can then be end-itemed into cloths of the desired size. If desired, they can additionally be printed beforehand.

Fiber-reinforced sponge cloths are brittle in the dry state, but do not break when subjected to mechanical loading. They are therefore marketed in dry form in few countries only. Moistened sponge cloths, by contrast, are more flexible and have a significantly better "hand". To keep the sponge cloth moist, the sponge cloth lengths are impregnated with an aqueous solution of a hygroscopic salt, more particularly magnesium chloride. Excess liquid is removed by means of a pair of squeeze rolls. The moist cloths are then packaged, normally in a polymeric film impermeable to water vapor.

Sponge cloths incorporating a net are likewise well-known and are manufactured on a large scale. Production involves a sponge cloth material, which contains dissolved cellulose xanthate (viscose) and a pore former, more particularly Glauber's salt, as essential constituents, being applied through a die as a thin layer onto a carrier belt. The net or grid is placed on this web. Immediately thereafter a further layer of the sponge cloth material is applied thereon. The net or grid consists for example of polyester or else of cotton. This intermediate is then led through various coagulation, regeneration and wash baths in which the cellulose from the cellulose xanthate is regenerated. Coagulation and regeneration can take place in acidic or alkaline baths. Sponge cloths with a net are simpler to produce than fiber-reinforced sponge cloths, since a net does not tend to become knotty, unlike fibers.

Sponge cloths with a net are virtually exclusively offered for sale in pre-moistened form. To this end, they are treated with the abovementioned aqueous magnesium chloride solution and then enclosed in a water-impermeable film pack. Dry sponge cloths with net reinforcement break very easily on being subjected to mechanical loading. The net or grid is then the only thing which holds the sponge cloth together at the bend point.

SUMMARY OF ADVANTAGEOUS EMBODIMENTS OF THE INVENTION

The present invention accordingly has for its object to improve the known sponge cloths with net such that they are bending stable in the dry state and the cellulose layer no longer breaks. The advantages of the sponge cloth with net, viz., its simpler production, shall be combined with those of the fiber-reinforced sponge cloth, viz., bending strength in the dry state. The present invention further has for its object to improve the abrasion resistance of known sponge cloths with net.

It has now been found that this object is achieved by a sponge cloth which contains a net and additionally short fibers and/or an additive having durably softening properties.

DETAILED DESCRIPTION OF ADVANTAGEOUS EMBODIMENTS OF THE INVENTION

The present invention accordingly provides a sponge cloth based on cellulose and having an internal reinforcement in the form of a net or grid, said sponge cloth further comprising a uniform distribution in said sponge cloth of fibers and/or permanently softening polymers not water-leachable.

Although not wishing to be bound by theory, it is believed that the fibers and the softening polymers reduce the crystallization tendency of the regenerated cellulose. They virtually act as dislocations. The polymers must not bring about any undesired coagulation of the viscose. However, they must have a durably softening effect. Nor shall they have leached out from the sponge cloth following prolonged use thereof.

The fibers used in the sponge cloth of the present invention can be relatively short and thick, since the net or grid assumes a large part of the mechanical reinforcement duty. Hence the fibers have a different shape and size than in the known fiber-reinforced sponge cloths. The average length is advantageously in the range from 0.1 to 0.6 cm and preferably in the range from 0.2 to 0.5 cm. The length to diameter ratio is generally in the range from 50:1 to 3:1 and preferably in the range from 10:1 to 4:1. The fibers themselves may consist of natural and/or synthetic material. Short or short-cut cotton fibers can be used for example. Short and relatively thick fibers are less prone to curl, which reduces knotting. This means that the fibers generally require no pretreatment such as opening and wetting. The material of the fibers should have the same or similar swelling and shrinkage properties as the regenerated cellulose in relation to contact with water. It is only then that delamination of the sponge cloth can be safely avoided.

The proportion of fibers is generally in the range from 10% to 40% by weight and preferably in the range from 15% to 35% by weight, all based on the weight of cellulose.

The softening polymers are hydrophilic but not water-soluble, i.e., their solubility in water amounts to less than 0.1 g in 1 liter of water at 20° C. They accordingly leach out only very slowly, if at all. The polymers added shall also not impair the biodegradability or compostability of the sponge cloths after use.

Particularly suitable softening polymers include hydrophilic biopolymers, specifically oligo- and polysaccharides and also derivatives thereof, for example fructans and levans, chitin, carrageenan, pectins and alginates and derivatives thereof, for example propylene glycol alginate, as well as cellulose ethers, such as carboxyalkylcellulose (for example carboxymethylcellulose), hydroxyalkylcellulose (for example hydroxyethyl- or hydroxypropylcellulose), alkylhydroxyalkylcellulose (for example methylhydroxyethylcellulose or ethylhydroxypropylcellulose). In addition to or in lieu of hydrophilic biopolymers, it is also possible to use synthetic hydrophilic polymers, such as polyvinylpyrrolidone and copolymers comprising vinylpyrrolidone units, dimethylaminoethyl methacrylates, polyacrylic acids (CARBOPOL®) or polymethacrylic acid or polylactide. The solubility of the hydrophilic polymers in water is if necessary limited to the requisite degree through the use of crosslinkers, such as glyoxylic acid. Crosslinkers generally effectuate linking of the softening polymers to the cellulose through covalent bonds.

The polymers mentioned reduce the crystallization tendency of the regenerated cellulose, the sponge cloth acquires a softer "hand" and does not break in the dry state.

The proportion of softening, hydrophilic polymers is generally in the range from 2% to 50% by weight, preferably in the range from 3% to 30% by weight and more preferably in the range from 5% to 25% by weight, all based on the weight of cellulose.

The fibers and/or the softening polymers improve not just the mechanical stability and integrity of the sponge cloth, but surprisingly also increase the abrasion resistance above that of the known sponge cloths with net, as the Veslic test in the inventive and comparative examples hereinbelow shows. They accordingly also last longer, which represents an appreciable performance advantage.

The mesh width of the net or grid is advantageously about 2 to 15 mm and preferably about 3 to 10 mm. The net or grid preferably comprises cotton or polyester or other synthetic and/or natural materials. The weight of the net is generally about 2 to 100 g/m$^2$, preferably in the range from 20 to 80 g/m$^2$ and more preferably in the range from 40 to 70 g/m$^2$.

The pore former is generally an inorganic salt which is readily soluble in water. Particular preference is given to salts which additionally have a low melting point. Alkali metal, alkaline earth metal and ammonium salts of inorganic acids, more particularly the chlorides (specifically NaCl and KCl, but not $MgCl_2$), sulfates (specifically sodium sulfate and magnesium sulfate), phosphates (specifically $Mg_3(PO_4)_2$) or silicates (specifically $Mg_2SiO_4$=forsterite) must be mentioned in this context. Glauber's salt (sodium sulfate decahydrate), which has a melting point of 32.4° C., is a particularly preferred pore former.

The average diameter of the salt crystals is generally up to 2.5 mm and preferably up to 2 mm. Less than ⅕ of the salt crystals should have a diameter of less than 0.3 mm. When the proportion of these particularly small salt crystals is higher, this leads to a sponge cloth having reduced water absorption capacity. The pore former becomes virtually completely dissolved out of the sponge cloth in the coagulation, regeneration and wash baths. The salt crystals leave behind voids of virtually the same size.

The proportion of pore former is generally about 30% to 90% by weight and preferably about 75% to 85% by weight, all based on the overall weight of the sponge cloth raw material.

The pulp from which the viscose for the production of the sponge cloth of the present invention is produced preferably has an average degree of polymerization ($DP_w$) in the range from 500 to 1600 and particularly preferably in the range from 800 to 1200. The pulp is preferably obtained from the wood of eucalyptus trees. It must be borne in mind here that $DP_w$ decreases in the course of viscose production, i.e., degradation of the cellulose chains takes place during viscose production.

The sponge cloth does not have any large pores visible to the naked eye that are typical of sponges. Accordingly, the production process does not involve the addition of blowing agents (diazo compounds for example) which form gas(es) under the production conditions.

To produce the sponge cloth of the present invention, viscose, pore former and also fibers and/or hydrophilic softening polymers are mixed together, advantageously in a kneader, to form a homogeneous mass. The sponge cloth raw material thus obtained is then formed on a carrier belt into a thin layer. The net or grid is placed on this layer, followed by a further layer of sponge cloth raw material. The net or grid will then be in a state of embedment in the sponge cloth material. The material passes on the belt through a heated—preferably alkaline—coagulation and regeneration bath. The raw sponge cloth is washed off to remove salt residues and any reaction products still present.

The sponge cloth of the present invention can be dry or pre-moistened. If moistened, it is advantageously moistened using an approximately 2% to 8% by weight aqueous magnesium chloride solution into which a scent oil, for example an oil with citrus or pine scent, may have optionally been emulsified.

The sponge cloth of the present invention can be end-itemed by methods which are common general knowledge among those skilled in the art. These include for example printing on either or both of the surfaces and cutting into pieces of appropriate size.

The sponge cloth of the present invention is primarily envisioned for use as a cleaning and decontaminating cloth in industry, commerce and the home.

The examples which follow serve to illustrate the invention. Percentages are by weight, unless otherwise stated or immediately apparent from the context.

INVENTIVE EXAMPLE 1

Sponge Cloth with Net and Fibers 510 g of eucalyptus pulp (Bahia SP from Bahia Pulp, Brazil) having an average degree of polymerization DPw of 1400 were slurried up in 3000 g of dilute (15% strength) aqueous sodium hydroxide solution. The alkali cellulose was converted with 250 g of $CS_2$ into cellulose xanthate, which was subsequently converted into viscose by dissolving with 1700 g of water. 300 g of this viscose were admixed with 1500 g of Glauber's salt as pore former and 100 g of cotton fibers having a length of 5 mm and a Micronaire of 3.4, followed by 3 g of blue pigment, by kneading at a temperature sufficient to ensure the requisite fluidity.

The sponge cloth raw material thus obtained was applied via two dies to a carrier belt, although following application of an underlayer from the first die a cotton net having a mesh width of 10 mm is unwound from a roll and applied to the underlayer. The second die is then used to apply an overlayer, and so the net comes to be in the middle. The net embedded in the raw material subsequently passes through a hot alkaline coagulation bath and was thereafter neutralized through an acid vat and freed of adhering salt residues and reaction products in the subsequent vat.

The basis weight of the sponge cloth thus obtained was 237 g/m$^2$ (absolutely dry, weight determined to DIN 53 854).

COMPARATIVE EXAMPLE 2

Conventional Sponge Cloth with Net but without Distributed Fibers (Commercially Available from Spontex S.A.))

The basis weight, absolutely dry, determined to DIN 53 854, was 265 g/m$^2$.

INVENTIVE EXAMPLE 3

Sponge Cloth with Net and Softening Polymers

Inventive example 1 was repeated except that instead of the cotton fibers 25 g of hydroxyethylcellulose (TYLOSE® H from SE Tylose GmbH & Co. KG) were mixed with the viscose in a separate kneading operation. After incorporation of the HEC by kneading, the rest of the procedure of inventive example 1 was followed.

The basis weight of the sponge cloth thus obtained, absolutely dry, determined to DIN 53 854, was 257 g/m$^2$.

INVENTIVE EXAMPLE 4

Sponge Cloth with Net, Softening Polymers and Fibers

Inventive example 1 was repeated except that 150 g of cotton fibers having a length of 5 mm and 25 g of HEC were introduced, and homogeneously distributed, in the mixture by kneading. Thereafter, the rest of the procedure described in inventive example 1 was followed.

The basis weight of the sponge cloth thus obtained, absolutely dry, determined to DIN 53 854, was 249 g/m$^2$.

COMPARATIVE EXAMPLE 5

Fiber-Reinforced Sponge Cloth without Net (Commercially Available from Kalle GmbH)

The basis weight, absolutely dry, determined to DIN 53 854, was 258 g/m$^2$.

Test for Leachability of Softening Polymers

The sponge cloth is fully immersed in water in a trough for 1 min, forced underneath the water surface by a perforated plate in order that it may become fully saturated with water. Thereafter, it is squeezed off by means of a pair of squeeze rolls (about 0.2 mm nip, 4.5 bar contact pressure) and the liquid run-off is collected.

After stripping off the water, the quantity of leached polymer was determined gravimetrically.

Test Result

|  | weighed polymer (HEC) mg/m$^2$ |
| --- | --- |
| Inventive example 3 Sponge cloth | 5 |
| Inventive example 4 Sponge cloth | 3 |

Test for Bending Strength of Dry Sponge Cloth

To test for bending strength, the sponge cloth is folded in the middle and the two corners are placed on top of each other. A weight of 1 kg was placed on the fold forming in the cloth, so that the areas come to lie on top of each other. The weight is removed after 30 seconds and the sponge cloth bent back by 360°, so that the two outside surfaces come to lie on each other. Thereafter, the edge again has a weight of 1 kg placed on it. This operation is repeated 10 times. How many folding cycles are needed for damage to the surface to occur is noted.

Bending Test Result:

| Sponge cloth of Example | Folding cycles |
| --- | --- |
| 1 | >10 |
| 2 | 1 |
| 3 | 6 |
| 4 | >10 |
| 5 | >10 |

The properties of the sponge cloths are collated in the table which follows.

| example | thickness in moist state) 1 [mm] | thickness in dry state) 2 [mm] | water absorption capacity) 4 [l/m$^2$] | Veslic test (number of rub cycles) | abrasion) 3 [g/m$^2$] |
| --- | --- | --- | --- | --- | --- |
| 1 | 5.0 | 2.1 | 4.24 | 8 | 53 |
| 2 | 5.2 | 2.2 | 4.76 | 26 | 48 |
| 3 | 5.3 | 2.2 | 5.31 | 19 | 45 |

-continued

| example | thickness in moist state) 1 [mm] | thickness in dry state) 2 [mm] | water absorption capacity) 4 [l/m$^2$] | Veslic test (number of rub cycles) | abrasion) 3 [g/m$^2$] |
|---|---|---|---|---|---|
| 4 | 5.1 | 2.1 | 5.15 | 33 | 31 |
| 5 | 5.6 | 2.3 | 6.05 | 91 | 36 |

) 1 DIN 53 855, 0.02 N/cm$^2$
) 2 DIN 53 855, 0.2 N/cm$^2$
) 3 DIN 53 528
) 4 water absorption capacity was determined as follows: First, a dish on a balance was filled with water to a depth of 3 cm. A wire net was laid horizontally into the water, removed again after 10 seconds in the horizontal position and fixed in this position above the surface of the water. The balance is tared to "zero" after 10 seconds to allow for the water carried over by the net. Then, the dry sponge cloth was placed on the net and immersed horizontally together with the net in the water for 10 seconds. Thereafter, the sponge cloth was removed from the water with the net in the horizontal position and suspended horizontally onto the storage position After a dripping time for 15 seconds, the amount of liquid removed via the sponge cloth from the dish was read off the balance. The moist area is then computed to determine the water absorption per square meter. This method allows determination of the maximum possible water absorption without losses due to hydrostatic pressure (in the case of vertical measurement).

That which is claimed:

1. A sponge cloth comprising cellulose and an internal reinforcement in the form of a net or grid, said sponge cloth further comprising a uniform distribution in said sponge cloth of fibers in addition to said net or grid and/or durably softening polymers that are not water-leachable,
    wherein the fibers have an average length of 0.1 to 0.6 cm and the net or grid has a mesh width of about 2 to 15 mm.

2. The sponge cloth according to claim 1, wherein the fibers have an average length of 0.2 to 0.5 cm.

3. The sponge cloth according to claim 1, wherein the fibers have a length to diameter ratio in the range from 50:1 to 3:1.

4. The sponge cloth according to claim 1, wherein the fibers have a length to diameter ratio in the range from 10:1 to 4:1.

5. The sponge cloth according to claim 1, wherein the fibers are present in a proportion ranging from 10% to 40% by weight, based on the weight of the cellulose.

6. The sponge cloth according to claim 1, wherein the fibers are present in a proportion ranging from 15% to 35% by weight, based on the weight of the cellulose.

7. The sponge cloth according to claim 1, wherein the softening polymers are hydrophilic biopolymers and/or hydrophilic synthetic polymers.

8. The sponge cloth according to claim 7, wherein the hydrophilic biopolymers are oligo- or polysaccharides or derivatives thereof and the hydrophilic synthetic polymers are polyvinylpyrrolidone and copolymers comprising vinylpyrrolidone units, dimethylaminoethyl methacrylates, poly(meth)acrylic acid or polylactides.

9. The sponge cloth according to claim 8, wherein the oligo- or polysaccharides or derivatives thereof are glycans, fructans, pectins or cellulose ethers.

10. The sponge cloth according to claim 9, wherein the glycans or fructans are chitin, chitosan, carrageenan or alginates or derivatives thereof.

11. The sponge cloth according to claim 1, wherein the fiber consists of natural material and the softening polymer is present in a proportion ranging from 2% to 50% by weight, based on the weight of cellulose.

12. The sponge cloth according to claim 1, wherein the softening polymer is present in a proportion ranging from 3% to 50% by weight, based on the weight of cellulose.

13. The sponge cloth according to claim 1, wherein the softening polymer is present in a proportion ranging from 5% to 50% by weight, based on the weight of cellulose.

14. The sponge cloth according to claim 1, wherein said sponge cloth is moistened.

15. The sponge cloth according to claim 14, wherein said sponge cloth is moistened with an aqueous magnesium chloride solution.

16. The sponge cloth to claim 1, wherein the sponge cloth comprises fibers in addition to said net or grid the fibers(i) have an average length of 0.1 to 0.6 cm, (i) a length to diameter ratio in the range from 50:1 to 3:1, (iii) are present in a proportion ranging from 10% to 40% by weight, based on the weight of the cellulose and the sponge cloth is bending stable in the dry state.

17. A sponge cloth comprising cellulose and an internal reinforcement in the form of a net or grid, said sponge cloth further comprising a uniform distribution in said sponge cloth of fibers in addition to said net or grid and durably softening polymers that are not water-leachable,
    wherein the fibers have an average length of 0.1 to 0.6 cm and the net or grid has a mesh width of about 2 to 15 mm.

18. A sponge cloth comprising cellulose and an internal reinforcement in the form of a net or grid, said sponge cloth further comprising a uniform distribution in said sponge cloth of fibers in addition to said net or grid,
    wherein the fibers have an average length of 0.1 to 0.6 cm and the net or grid has a mesh width of about 2 to 15 mm.

19. A sponge cloth comprising cellulose and an internal reinforcement in the form of a net or grid, said sponge cloth further comprising a uniform distribution in said sponge cloth of fibers in addition to said net or grid and/or durably softening polymers that are not water-leachable,
    wherein the net or grid has a mesh width of about 2 to 15 mm and a durably softening polymers reduce the crystallization tendency of the cellulose.

* * * * *